United States Patent [19]

Fisher

[11] Patent Number: 4,480,180
[45] Date of Patent: Oct. 30, 1984

[54] CARTRIDGE ASSEMBLY FOR DATA-SENSING SYSTEM

[76] Inventor: Charles R. Fisher, 34781 Glen Dr., Eastlake, Ohio 44094

[21] Appl. No.: 261,683

[22] Filed: May 7, 1981

[51] Int. Cl.³ ............................................. G06K 13/00
[52] U.S. Cl. .................................... 235/475; 234/479; 234/482
[58] Field of Search ............... 235/435, 482, 449, 479, 235/458, 475; 340/825.33, 825.34

[56] References Cited

U.S. PATENT DOCUMENTS

| 3,132,241 | 5/1964 | Wolfheimer | 235/482 |
|---|---|---|---|
| 3,308,252 | 3/1967 | Rosen | 235/479 |
| 3,433,932 | 3/1969 | Rolke | 235/479 |
| 3,876,865 | 4/1975 | Bliss | 340/825.34 |
| 4,114,028 | 9/1978 | Baio | 235/482 |
| 4,186,416 | 1/1980 | Nozaki | 235/482 |

Primary Examiner—Harold I. Pitts
Attorney, Agent, or Firm—Watts, Hoffmann, Fisher & Heinke Co.

[57] ABSTRACT

A cartridge assembly of the type to receive a card with coded information designed to be retrieved or read so as to provide electrical signals corresponding to selected indicia (i.e., points) on the card. These signals are then used to operate any suitable read-out or print-out device to display the information originally defined by the code in the card. In one form the cartridge assembly may be inserted from the front of the terminal for plug-in application and in another form may form an integral part of the terminal.

12 Claims, 7 Drawing Figures

CARTRIDGE ASSEMBLY FOR DATA-SENSING SYSTEM

TECHNICAL FIELD

The present invention relates generally to the field of data-sensing systems for identification and/or security purposes, and more particularly relates to a new and improved cartridge assembly for use with data-sensing systems of the type as may be applied to credit cards, security badges or the like. By the term, "card" it is meant herein to include any type of media wherein it might be desirable to provide codes (invisible or otherwise) for identification and/or security purposes or any type of data input.

The cartridge assembly of the present invention incorporates a new and novel "pluggable" cartridge unit adapted to receive a data carrier, such as a credit card, security card, or the like for automatic reading of coded information which is susceptible for use in a wide variety of applications. Such applications include commercial and industrial uses, such as time and attendance, inventory control, automated manufacturing and processing systems, banking and financial applications, access control systems (i.e. entry authorization, vending machines, voting equipment or the like)

RELATED PATENTS

The inventor herein, Charles R. Fisher, is the inventor of U.S. Pat. No. 3,562,496 issued Feb. 9, 1971 for "Data-Sensing Device". This patent relates to a data-sensing device (card reader) which provides for the automatic read-out of a data carrier, such as a verification, security card or the like. The present invention also relates to U.S. application Ser. No. 06/092,452 filed Nov. 8, 1979, to Charles R. Fisher for "Cartridge Assembly for Data-Sensing Systems".

BACKGROUND ART

As known in the art, the particular material on which information is to be stored and subsequently retrieved (decoded) is typically referred to as a card or badge; for example, a credit or security card. The card, for example, may be of the punched hole type identified in aforementioned U.S. Pat. No. 3,562,496 or may incorporate an array of indicia physically spaced on the card or medium providing the carrying coded information to render selected areas electrically or conductive than the remaining portions of the card. The areas selected define a code of the particular information to be stored in the card in much the same way that the particular selected areas punched out in a punched type card, as in U.S. Pat. No. 3,562,496, are utilized to store information. Accordingly, in the present invention, the term "card" is understood to include equivalent type media for use with card readers, such as mechanical, electrical, optical or magnetic to provide coded information (invisible or otherwise) for identification and/or security purposes.

In applicant's forementioned application Ser. No. 06/092,452, U.S. Pat. Nos. 3,769,552; 4,112,292 and 3,953,712 were made of record.

DISCLOSURE OF THE INVENTION

The present invention contemplates a new and novel construction for a cartridge assembly which is of a simple, yet rugged self-contained construction for ready attachment to any convenient support structure, such as a wall mounted console, desk mounted console, or the like. In the invention, the cartridge assembly is of the type to receive a card with coded information designed to be retrieved or read so as to provide electrical signals corresponding to selected indicia (i.e., point) on the card. These signals are then used to operate any suitable read-out or print-out device to display the information originally defined by the code in the card. Similarly, the same signals can also be used to feed the input into a computer, memory bank or other equipment in order to yield the information stored in the card.

More specifically, in the invention, the cartridge assembly has been hereinafter illustrated in two modified forms to illustrate the scope of the invention. One form, the cartridge assembly includes a first read-head member made integral, for example, with the console of the terminal, and a second read-head member which is pivotally associated with the first read-head member so as to define a slot or passageway therebetween for slidably receiving a card to be read. Each read-head member includes a pre-determined array of apertures adapted to receive electrical contacts from electrical control members (PCB) mounted in superimposed relation on each of the read-head members. This array defines an area corresponding to an area of a portion of the card on which the information has been recorded. Electrical control members may be connected to a suitable source of electrical power (not shown) with one of the members being connected in circuit to a computer, memory bank or other equipment in order to yield the information, as desired. In another form, the cartridge assembly includes a pair of oppositely disposed read-head members which are pivotally attached at one end and which define a slot or passageway therebetween for slidably receiving a card to be read, as aforesaid. In this form, the cartridge assembly may be inserted from the front of the terminal console so that it can be quickly and easily "plugged" in for automatic read-out.

From the foregoing, it will be seen that the present invention provides a simple yet rugged construction of a cartridge assembly which utilizes a cartridge unit that is either made integral with or easily "plugged" in for automatic read-out. Significantly, these embodiments provide a construction and design which is easy to clean and maintain and hence, minimizes the need for on-site repairs so as to optimize the performance characteristics of the card reader functions. In addition, due to the simplicity of the reader cartridge construction, no tools or special technical skill is required to replace or clean the reader cartridge. In the interim, it is merely required that the cable connectors be disconnected to enable the cartridge to be pulled out of the mounting as in the "plugable" type. Other advantages and objects of the invention will become more apparent taken in conjunction with the following drawings, specification and claims.

BEST MODE FOR CARRYING OUT THE INVENTION

Figure 1:
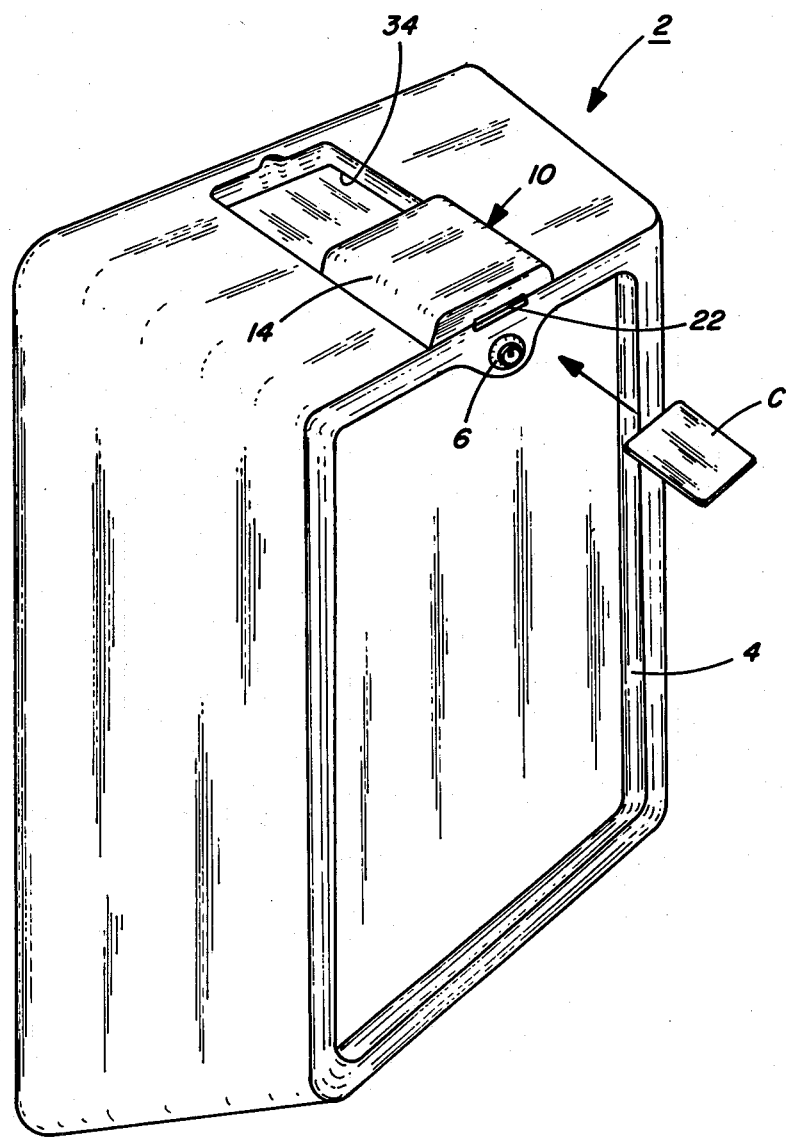
FIG. 1 is a generally perspective view illustrating the console unit of the present invention in association with one form of the cartridge assembly.
Figure 2:
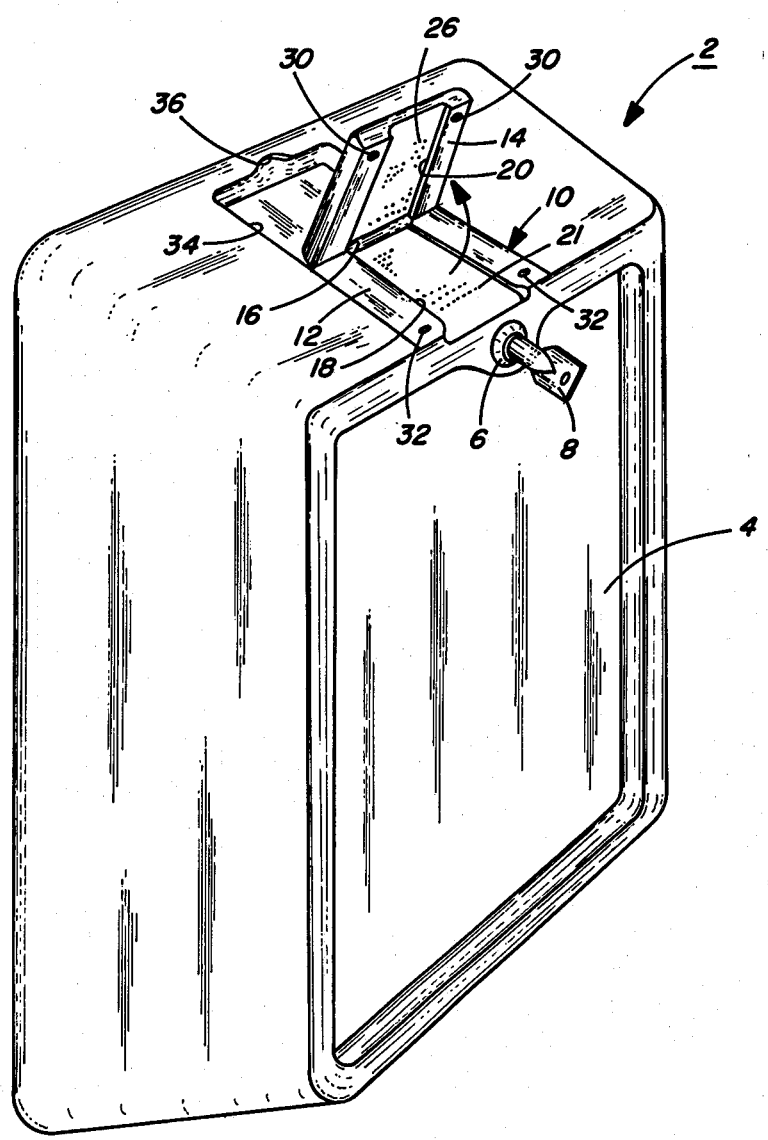
FIG. 2 is a generally perspective view illustrating one of the read-head members pivoted to an open position.
Figure 3:
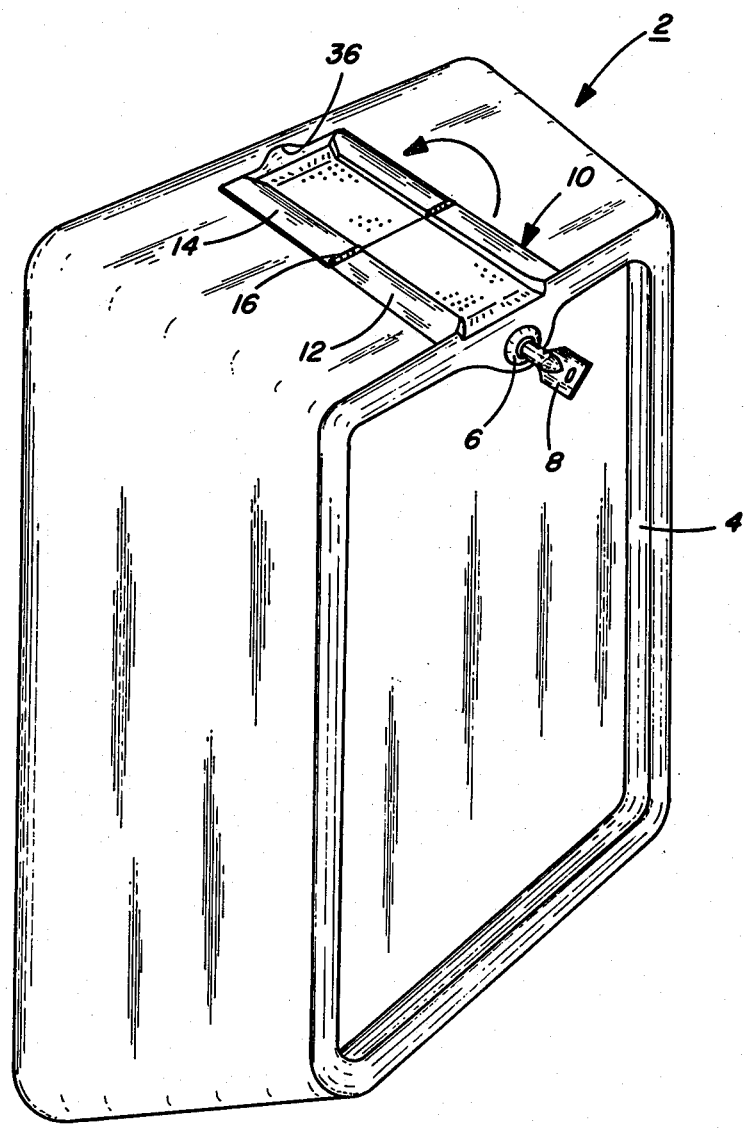
FIG. 3 is a generally perspective view illustrating one of the read-head members in the full-open position.
Figure 4:
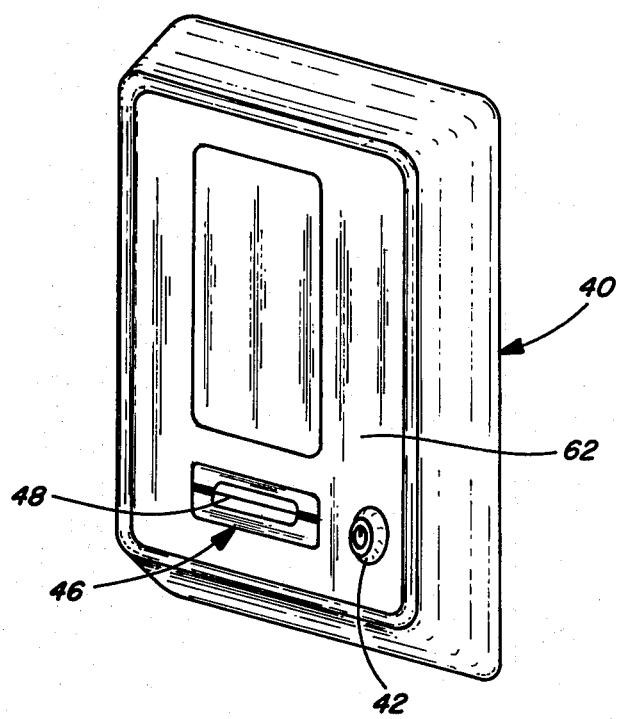
FIG. 4 is a generally perspective view illustrating another embodiment of the terminal console.
Figure 5:
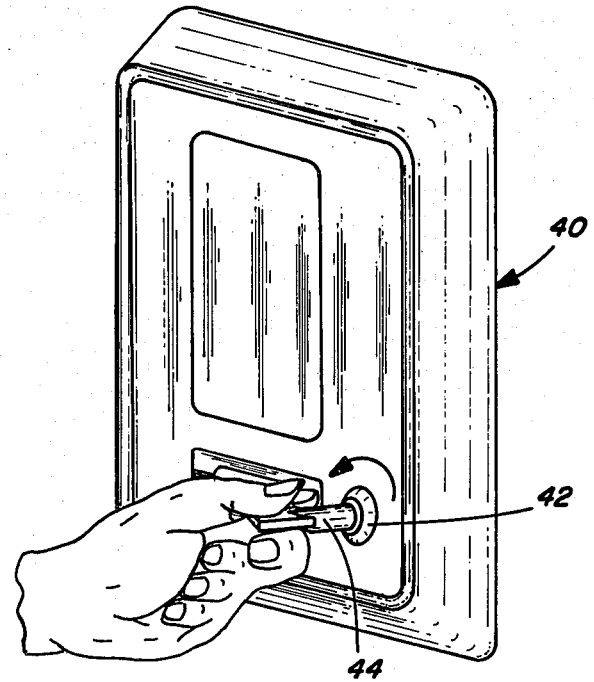
FIG. 5 is a generally perspective view illustrating the terminal console of FIG. 4 with the key-lock being schematically actuated.

Referring again to the drawings and in particular to FIGS. 1 to 3, thereof, there is illustrated a data-sensing device designated generally at 2, which provides a data input terminal in accordance with the invention. In the form shown, the device is a wall mounted type adapted to receive a data carrier, such as a security card, personal badge or other such identification card, as at C, as desired. It will be recognized, however, that the device may not only be wall mounted, but may be constructed and arranged for any convenient installation, such as a desk top or the like.

In this embodiment of the invention, the data-sensing device includes a hollow console unit 4 which may be quickly and easily wall mounted. The structural details of this type of console are more fully disclosed in applicant's aforementioned U.S. application Ser. No. 06/092,452 which is incorporated herein by reference. In this form, the console may be provided with a key-lock, as at 6, for actuation by a key 8 which effectively locks and unlocks the cartridge assembly, as will be hereinafter described.

In this embodiment, the cartridge assembly, designated generally at 10, includes an oppositely disposed pair of read-head members 12 and 14 which are pivotally connected together, as at 16, by a suitable hinge connection. Accordingly, the read-head members 12 and 14 each have recess cavities 18 and 20 defining a slot for receiving the card C slidably therein. In the invention, the slot or space 22 (FIG. 1) is dimensioned so as to receive the card in relatively close fitting relationship so as to prevent lateral shifting of the card upon insertion in or removal of the same, and to accurately position the card for precise read-out by the electronics of the system.

The read-head members 12 and 14 may be made of any suitable high-impact material, such as a plastic composition or the like. The members each include an array of electrical terminals (electrodes), as at 24 and 26 which correspond in number with an array of electrical solder connections provided on each of an electric control member (not shown), such as a printed circuit board which, in turn, defines an area corresponding to the area of a portion of the card on which information is recorded and/or is to be read. In the embodiment illustrated, the printed circuit boards (PCB) may be disposed within each of the respective read-head members, and either one of the printed circuit boards may be provided with an electrical connection so that the signals provided can be used to feed input to a computer, memory bank, or other equipment in order to yield the information, as desired.

Now in this embodiment, the read-head member 14 may be provided with bosses, as at 30 for reception in corresponding apertures, as at 32, in the other read-head member 12 to provide registration between the component parts. Accordingly, upon actuation of the key-lock, the members are interlocked for reception of the card and may be unlocked for cleaning purposes or the like. In this form, the upper portion of the terminal is provided with a recess cavity, as at 34, which allows the upper member 14 to be disposed in a flush relation in the full-open position to facilitate cleaning thereof. The recess 34 may be provided with a cut-out slot 36 to allow insertion of a finger or the like for purposes of lifting the member 14 into a closed position.

Accordingly, in this form of the invention will be seen that the device is, in effect, a one-piece construction defined by a fixed and a movable portion, as distinguished from a removable, plug-in cartridge assembly.

In FIGS. 4–7, there is illustrated another modified form of the invention wherein the console terminal, designated generally at 40, provides a front loading design. In this form, the console may be provided with a key-lock 42 such that upon actuation of a key 44 a cartridge assembly, designated generally at 46, may be removed from the front of the terminal for purposes of cleaning or the like. Here afain, the cartridge 46 has a slot 48 to receive a card C of the type illustrated in FIG. 1.

In this form, the cartridge assembly 46 includes a pair of oppositely disposed read-head members 48 and 50 which are pivotally mounted to one another, as at 52, such as by a piano spring or the like. In this form, each read-head member is provided with electrical terminals (electrodes) which correspond in number with an array of electrical solder connections 56 (FIG. 7) provided on each of the respective electric control members 58, such as printed circuit boards, which in turn, define an area corresponding to the area of a portion of the card on which information is recorded and/or is to be read. Again, the printed circuit boards may be provided with an electrical connection (not shown) so that the signals can be used to feed input to a computer, memory bank, or other equipment.

In this form, the cartridge device defined by the read-head members 48 and 50 are inserted through an opening 60 provided in the front 62 of the console and into an integral receptacle, as at 64, which includes a pair of oppositely disposed guide members 66 and 68 each having guide tracks 70 and 72 adapted to slidably receive the joined read-head members 48 and 50 therebetween. For this purpose, each of the read-head members may be provided with an integral flange 74 and 76 defining a generally L-shaped configuration adapted to seat in a corresponding recess 78 and 80 provided in the front wall 62 of the console.

In this embodiment, there may be attached to the hinge 52 or to the rear of the read-head members a resilient compression spring 82 which is fixedly attached at its opposite end, as at 84, to a support plate member fixedly disposed within the console. The spring 82 may pass through an aperture, as at 88, provided in another support plate member 90 which may provide an abutment or stop for the printed circuit boards 58 in the intalled position of the cartridge assembly. By this arrangement, the cartridge assembly can be quickly and easily front loaded into the receptacle 64 and is resilient biased so as to be automatically retracted into the closed position upon release of the cartridge assembly by the operator. In addition, the pivotal hinge connection 52 enables the respective read-head members 40 and 50 to be swung apart to facilitate cleaning thereof. The compression spring 82 may be disposed within a guide member 94 which is fixedly attached to the support plate member 86, as desired.

Figure 6:
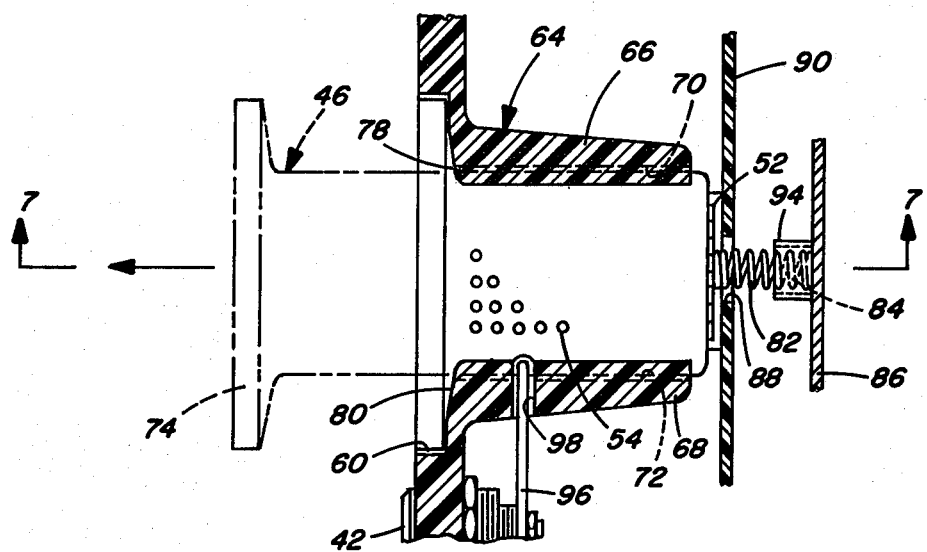
FIG. 6 is a fragmentary, top-plan view of a modified form of the cartridge assembly.
Figure 7:
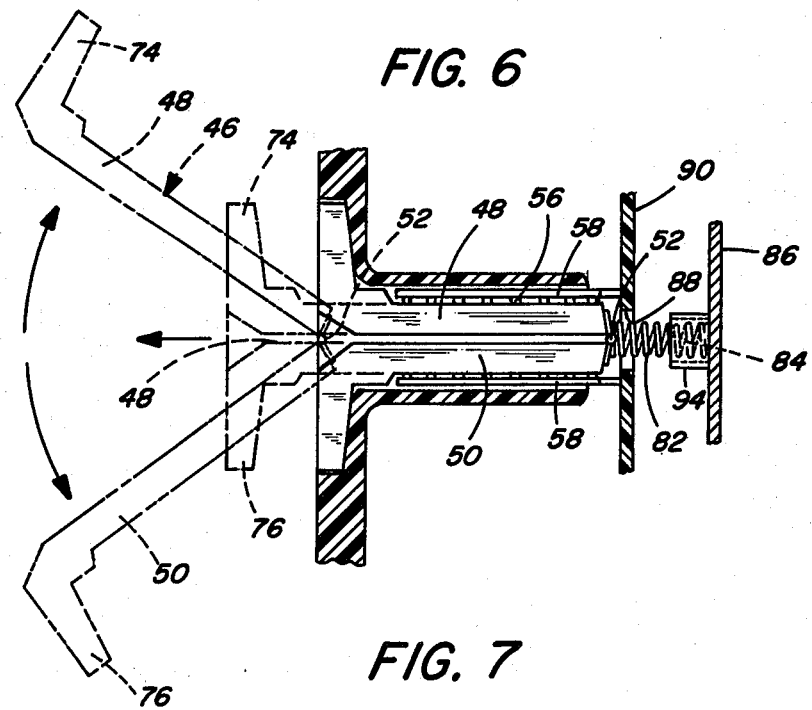
FIG. 7 is a fragmentary, horizontal section view taken along the line 7—7 of FIG. 6.

As best seen in FIG. 6, the key-lock 42 includes a rotatable arm or finger element 96 adapted to be pivoted inwardly and outwardly of a corresponding slot 98 provided in the receptacle 64 so as to hold the cartridge assembly in the locked position. Upon release of the key-lock, the cartridge assembly will be automatically ejected from the receptacle 64 and then automatically pivoted to an open position, as illustrated in dotted line, to facilitate cleaning thereof.

I claim:

1. In a data-sensing system of the type for reading coded information on a data carrier, such as a credit card, security card or other such identification card, comprising:
   (a) a terminal console;
   (b) a cartridge means operably associated with said terminal console;
   (c) said cartridge means including at least one read-head member adapted for pivotal movement toward and away from another read-head member;
   (d) said read-head members together defining a passageway therebetween adapted to removably receive a data-carrier;
   (e) said read-head members including electronic control circuit means adapted for connection to a power means; and,
   (f) said read-head members are resiliently attached adjacent one end interiorly of said terminal console and are adapted for automatic pivotal movement away from one another upon removal of said read-head members from said receptacle means.

2. In a data-sensing system of the type for reading coded information on a data carrier, such as a credit card, security card or other such identification card, comprising:
   (a) a terminal console;
   (b) a cartridge means operably associated with said terminal console;
   (c) said cartridge means including at least one read-head member adapted for pivotal movement toward and away from another read-head member;
   (d) said read-head members together defining a passageway therebetween adapted to removably receive a data-carrier;
   (e) said read-head members including electronic control circuit means adapted for connection to a power means; and,
   (f) lock means are operably associated with said receptacle means for locking said read-head members within said receptacle means.

3. In a data-system in accordance with claim 1, wherein:
   (a) each of said read-head members include a predetermined number of electrical terminals extending there through for electronically communicating with printed circuit means with said data carrier.

4. In a data-sensing system in accordance with claim 1, wherein:
   (a) said read-head members are pivotally connected to one another adjacent one end.

5. In a data-sensing system in accordance with claim 1, wherein:
   (a) said terminal console includes a recess portion adapted to receive one of said read-head members in the full open position.

6. In a data-sensing system in accordance with claim 1, wherein:
   (a) one of said read-head members is fixedly attached to said terminal console and the other of said read-head members is pivotally attached to said first mentioned read-head member for pivotal movement toward and away from said other read-head member.

7. In a data-sensing system in accordance with claim 1, wherein:
   (a) said read-head members are pivotally attached to one another adjacent one end thereof;
   (b) receptacle means adapted to be mounted interiorly of said terminal console and said read-head members being adapted to inserted, as a unit, into said receptacle means; and,
   (c) said data carrier adapted to be inserted into the passageway between said read-head members through an opening provided in the front of said terminal console.

8. A In a data-sensing system in accordance with claim 1, wherein:
   (a) said read-head members include means for pivotally attaching the same together adjacent one end thereof;
   (b) said read-head members each including an array of electrical contact means which generally define an area corresponding to the area of a portion of the data card to be read; and,
   (c) an electrical control member associated with each of said read-head members for selectively reading the information on said data card upon energization from a power source.

9. In a data-sensing system in accordance with claim 1 wherein resilient spring-means are fixedly attached to one end of said cartridge means and at the other end attached to the interior of said console for resiliently maintaining said cartridge means relative to said console.

10. In a data-sensing system in accordance with claim 1 including:
    a lock means carried by said console and operably associated with said cartridge means for selectively locking said cartridge means in fixed relation interiorly of said console.

11. In a data-sensing system in accordance with claim 1 wherein said cartridge means includes a cartridge unit which is pluggable electrically into a receptacle provided in said console for electrically reading coded information provided on a data carrier inserted in the passageway between said read-head members.

12. In a data-sensing system of the type for reading coded information on a data carrier, such as a credit card, security card or other such identification card comprising:
    (a) a terminal console;
    (b) a cartridge means including a cartridge member which is electrically pluggable into a receptacle provided in said terminal console;
    (c) said cartridge member including a pair of read-head members with one of said members being adapted for pivotal movement toward and away from the other of said members;
    (d) said read-head members defining a passageway therebetween to removably receive a data carrier for electronically reading information coded on said data carrier;
    (e) said read-head members including electronic control printed circuit means adapted for connection to a source of power for electronically reading the information coded on said data carrier when the cartridge member is inserted in the receptacle in said cartridge member;

(f) each of said read-head members including a predetermined number of electrical terminals extending therethrough for electronically communicating said printed circuit means with said data-carrier;

(g) said read-head members each including an array of electrical contact means which generally define an area corresponding to the data-carrier to be read, and (h) lock means operably associated between said cartridge member and said receptacle for retaining said cartridge member in the installed electronic reading position of said cartridge member with said receptacle.

* * * * *

UNITED STATES PATENT AND TRADEMARK OFFICE
CERTIFICATE OF CORRECTION

PATENT NO. : 4,480,180
DATED : October 30, 1984
INVENTOR(S) : Charles R. Fisher

It is certified that error appears in the above-identified patent and that said Letters Patent is hereby corrected as shown below:

Column 4, line 19, "afain" should be -- again --;
line 58, "intalled" should be -- installed --.

Signed and Sealed this

Sixteenth Day of April 1985

[SEAL]

Attest:

DONALD J. QUIGG

Attesting Officer

Acting Commissioner of Patents and Trademarks